March 19, 1935. E. E. KEINERT ET AL 1,995,252
TITLE ATTACHMENT FOR CAMERAS
Filed Aug. 22, 1933    3 Sheets-Sheet 2
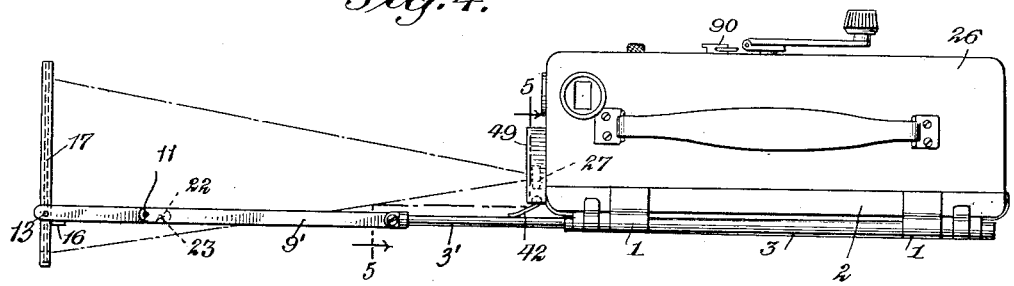
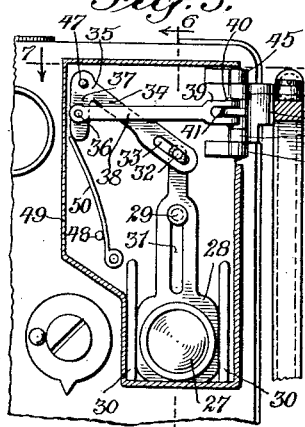
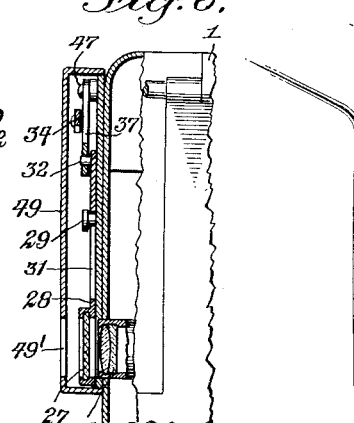
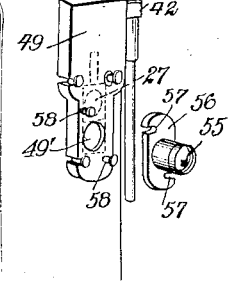
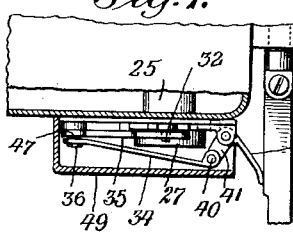
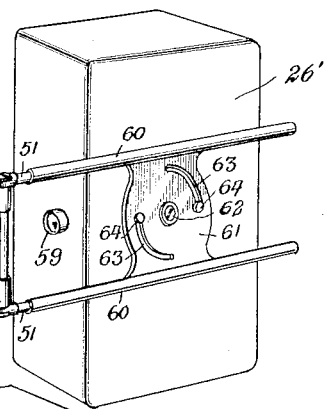
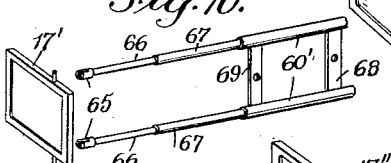
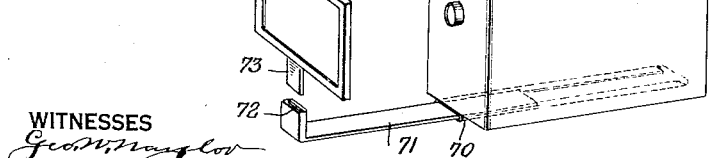
INVENTORS
Elwyn E. Keinert
James W. Kopke and
Samuel E. Faucett
BY
ATTORNEYS
WITNESSES March 19, 1935.  E. E. KEINERT ET AL  1,995,252
TITLE ATTACHMENT FOR CAMERAS
Filed Aug. 22, 1933  3 Sheets-Sheet 3
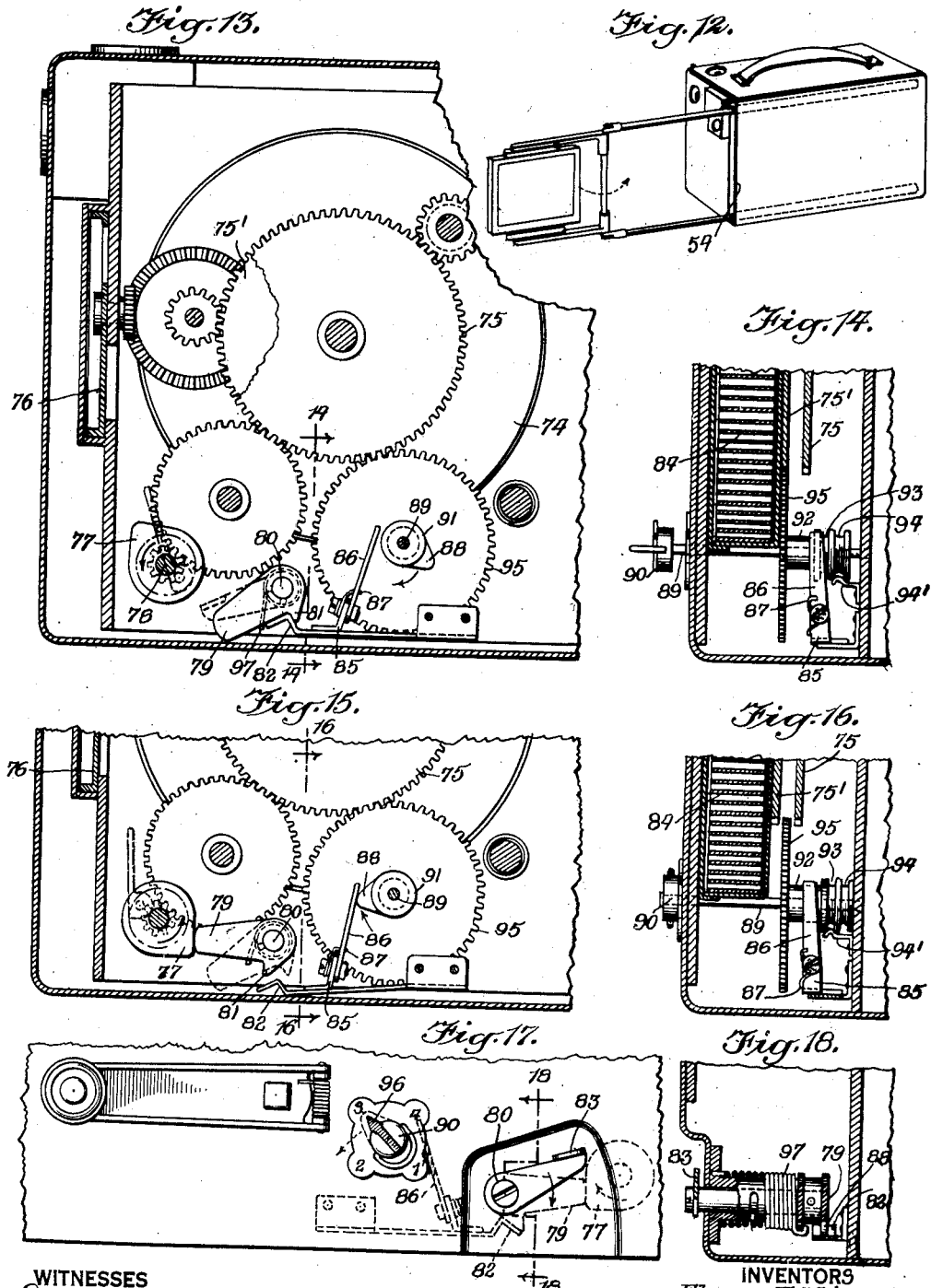
WITNESSES
INVENTORS
Elwyn E. Keinert
James W. Kopke and
Samuel E. Faucett
BY
ATTORNEYS Patented Mar. 19, 1935

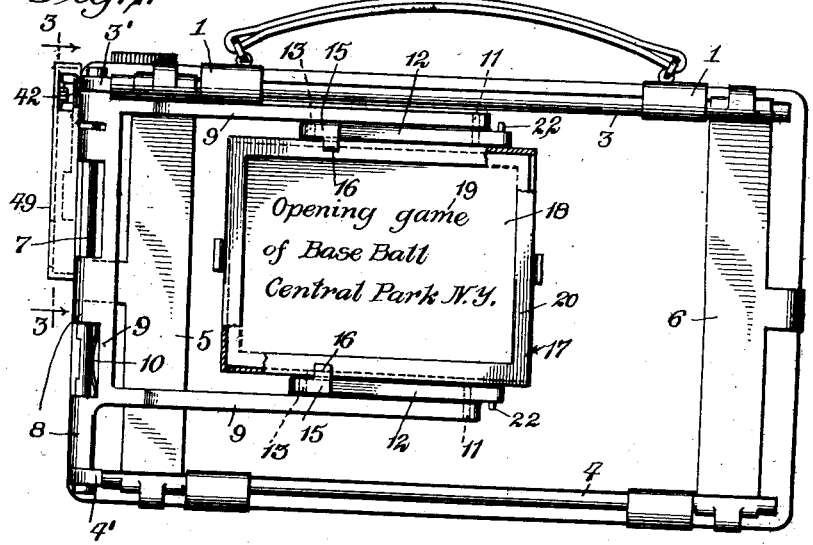
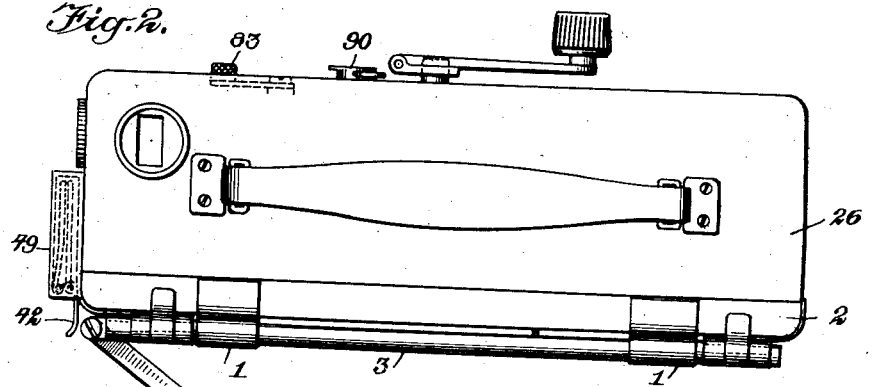
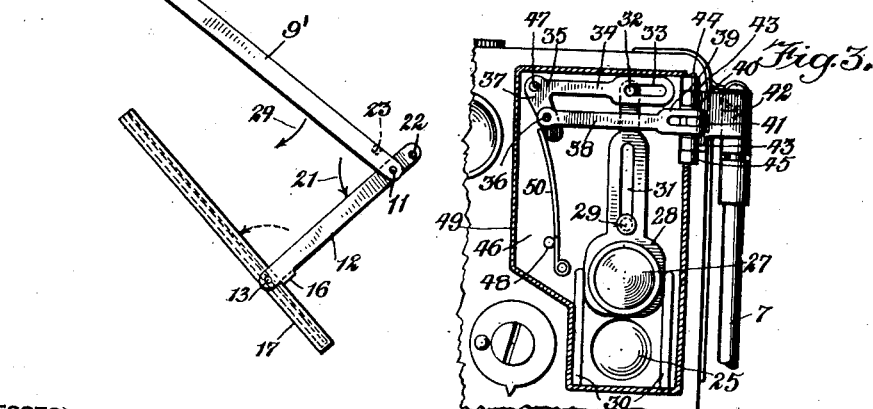

1,995,252

UNITED STATES PATENT OFFICE 1,995,252

TITLE ATTACHMENT FOR CAMERAS

Elwyn E. Keinert, James W. Kopke, and Samuel E. Faucett, Brooklyn, N. Y.

Application August 22, 1933, Serial No. 686,272

9 Claims. (Cl. 88—16)

This invention relates to an improved title attachment for cameras, and has for an object to provide an improved construction which can be used with moving picture cameras or with still cameras, and when functioning will hold the title sheet so as to be readily focussed on the film of the camera.

Another object of the invention is to provide a title attachment for moving picture cameras or for still cameras which may be a permanent part of the camera, or may be attached thereto with the parts so formed that when in one position they are out of the way and inoperative, and when in another position act to hold the title carrying sheet in front of the lens.

A further object of the invention is to provide a title attachment for cameras wherein means are connected with the title holding frame for varying the focus of the camera whereby the title sheet carried by the holder is properly focussed on the film of the camera.

An additional object is to provide an improved construction of title holder which may either be swingably mounted or slidably mounted on the camera, and formed with a lens shifting mechanism adapted to move an auxiliary lens in front of the regular lens of the camera when the title carrying frame is moved into functioning position.

A still further object of the present invention is to provide a title holder which provides means for automatically focussing the camera when moving the holder to functioning position, the same being associated with a timing structure for timing the operation of the camera to the number of lines being photographed when the device is used on moving picture cameras.

A further additional object is to provide a camera with means for holding the title in a predetermined focussed position and means for automatically operating the camera for a desired length of time according to the number of lines being held in front of the lens.

In the accompanying drawings—

Figure 1 is a side view of a well known camera now on the market, with a title holder comprising an embodiment of the invention applied thereto and shown in nonfunctioning position;

Figure 2 is a top plan view of the structure shown in Figure 1, with certain parts of the holder moved outwardly;

Figure 3 is a fragmentary sectional view through Figure 1 on the line 3—3, the same being on a large scale;

Figure 4 is a view similar to Figure 2 but showing the title holder in functioning position;

Figure 5 is an enlarged fragmentary sectional view through Figure 4 on the line 5—5;

Figure 6 is a sectional view through Figure 5 on the line 6—6;

Figure 7 is a horizontal sectional view through Figure 5 on the line 7—7;

Figure 8 is a detailed fragmentary perspective view of part of the camera with a modified form of the invention applied thereto;

Figure 9 is a perspective view of a camera having the lens opening at a different place from that shown in Figure 4, and illustrating how the holder may be swingably mounted on the camera;

Figure 10 is a perspective view showing a modified form of holder;

Figure 11 is a perspective view showing a further modified form of holder;

Figure 12 is a perspective view of a camera similar to that shown in Figure 4 with a telescoping holder and a cover plate associated therewith, illustrating how the holder may be nested within the cover plate when not in use;

Figure 13 is a fragmentary sectional view through the front part of the camera shown in Figure 2;

Figure 14 is a fragmentary sectional view through Figure 13 on the line 14—14;

Figure 15 is a view similar to the lower part of Figure 13, but illustrating the parts in a different position;

Figure 16 is a sectional view through Figure 15 on the line 16—16;

Figure 17 is an exterior view opposite the parts shown in Figure 15;

Figure 18 is a sectional view through Figure 17 on the line 18—18.

In making moving picture films it has been quite common to take the desired pictures and at some later time take other pictures of titles to the various scenes of the first film, and then splice the two films together so that the titles will appear in the correct places on the completed combined films. This has been done with both professional moving picture cameras and small cameras used by amateurs. This involves considerable work and expense, as well as quite often preventing the securing of really accurate titles when the work is done by amateurs. In the present invention a structure has been provided which will permit the operator to almost instantly focus a title sheet and then expose the same for a correct period of time, the same being focussed on the regular film in the camera, and after this has been done the parts may be quickly moved to nonfunctioning position and the camera operated in the usual manner of moving picture cameras or still cameras, as the case may be. After the desired picture has been taken, a second title may be quickly moved into focus and exposed to the regular film in the camera, after which the parts may be again quickly moved to one side and the camera used to take the second picture. In this way the titles are on the same film as the pictures and, therefore, no splicing is necessary and, in addition, the correct and desired titles are provided, especially where a camera is being used by an amateur when taking pictures for his own pleasure. The device may be used on still cameras but is illustrated on a moving picture camera in the accompanying drawings. It will be described with respect to the camera shown in the drawings which is a well known Eastman camera of the moving picture type used by amateurs.

In a camera of this type, a spring is provided and this spring is connected to the usual shutter mechanism which is adapted to be set in motion or stopped at the will of the operator. Associated with this camera structure, which is old and well known, is an improved means for supporting and holding in proper focussed position a title sheet and also for causing the camera to function for the proper length of time when taking a title. For instance, when taking a title having one line, the camera is caused to function a certain length of time, but when taking a title having three lines, approximately three times as much film is used to film the title, so that when it is exposed in a moving picture projector it will remain exposed sufficiently long to be easily read.

As shown in Figures 1 to 7, inclusive, the device has been illustrated as being slidably and swingably mounted on one side of the camera. As illustrated in these figures there is provided holding clips 1 which are folded over in place on the camera side plate 2. These clips are tightly fitted over the tubular rods 3 and 4, which rods are welded, soldered or otherwise connected to the end plates 5 and 6. These end plates fit flatwise against the removable side plate 2 and act with the tubular rods 3 and 4 and the clips 1 as a supporting frame. A rod 7 is rigidly secured at its respective ends in any desired manner, for instance, by screws, to the ends of rods 3' and 4' which slidingly fit into the respective tubular rods 3 and 4. On rod 7 are rotatably positioned tubular members 8 which are welded, soldered or otherwise rigidly secured to a rigid frame 9 having arms 9'. One or more springs 10 are carried by the frame 9 and continually press against rod 7 so as to frictionally hold the frame in any position in which it may be left.

Arms 9' at their outer ends carry pivotal pins 11 which extend into links 12. Each of these links carries a plate 15 having an offset shoulder 16 overlapping the frame 17 into which a sheet 18 of paper or other material is adapted to be positioned, said sheet carrying the title 19 written or printed thereon. Frame 17 is pivotally mounted by pins 13 on links 12 and is made from channel material, as, for instance, channel iron or wood, except the end 20 which is made up of two plates spaced apart. This forms an opening at this end and channels whereby a piece of paper may be slid in through this end and into the position shown in Figure 1. The parts as shown in Figure 1 are all positioned substantially flat against the side plate 2, but when the sheet 18 is to be focussed the parts are swung outwardly as shown in Figure 2 and the links 12 swung in the direction of the arrow 21 until pins 22 fit into the notches 23. The frame 17 is then swung to a position at right angles to the links 12, or until it strikes the shoulders 16, as shown in Figure 4. When the arms 9' are swung as indicated by the arrow 24 outwardly to their fullest extent, they will be in substantial alignment with rods 3 and 4 and the center of the frame 17 will be opposite the usual lens 25 of the camera 26. The frame 17 is preferably only a short distance in front of lens 25, for instance, ten or twelve inches for the average camera. Evidently it could be arranged closer or farther away, as desired, but most lenses in cameras of this type cannot be focussed at such a short distance. Consequently an auxiliary lens 27 is provided which is brought in front of lens 25 so as to automatically change the focus whereby the title sheet 18 will be properly focussed on the film of the camera 26.

As shown in Figures 3 and 5 the lens 27 is carried by a sliding plate 28 guided by a pin 29 and also the guide rails 30. Plate 28 is provided with a slot 31 for accommodating the guiding pin 29 carried by the supporting plate 46. Pin 32 extends from the extreme upper end of plate 28 as shown in Figure 3, and through the slot 33 of the arm 34 of bell crank lever 35. Pin 36 is carried by the arm 37 of bell crank lever 35, and on this pin is journaled a link 38 which has a bifurcated end 39 carrying the pin 40, which pin extends through the bifurcated end and also through the ear 41, which ear is preferably an upstanding integral projection from plate 42, which plate also has ears 43 surrounding a pin 44 mounted in the journal members 45 which are rigidly secured to plate 46. Plate 46 is a foundation plate on which pin 29, pin 47 and pin 48 are secured. This plate also carries guides 30 and, in turn, is secured by screws or other means to the front of the camera 26. A cover 49 fits over the plate 46 and is held thereto by frictionally engaging the side edges thereof. It will be understood that cover 49 has an opening 49' opposite lens 25, so that as far as this plate is concerned the lens is continually functioning. Plate 42 extends outwardly away from plate 46 a sufficient distance to be engaged by frame 9 as the frame is swung into alignment with rods 3 and 4. As frame 9 is swung as just described, plate 42 will also be swung and will transmit movement to link 38, which is transmitted to bell crank lever 35 and through pin 32 to plate 28 to cause this plate to lower the lens 27 to a position in front of lens 25. When the frame 9 is moved back to the position shown in Figure 1, spring 50 acting on the arm 37 brings the parts back to their former position, namely, to the position shown in Figure 3.

It will thus be seen that whenever the title sheet carrying frame is swung into functioning position, lens 27 will be automatically moved over lens 25 so that the title carrying sheet will be instantly focussed. The only thing then left to be done is to operate the camera to secure the desired exposures. The frame 17 and associated parts are then swung to the position shown in Figure 1 and the camera is in position to take the usual pictures in the usual manner. It will be understood that no change whatever is made in the camera, but the title holder embodying the invention is applied thereto either as an integral part or as an attachment, as shown in the accompanying drawings. The title holder embodying the invention has been shown applied to a particular camera, but it will be understood that it may be readily applied to any desired camera without departing from the spirit of the invention.

As shown in Figure 1, the rods 3' and 4' are telescopically mounted in the tubular rods 3 and 4. When the ends of rods 3' and 4' strike plate 42, said plate swings back to the position shown in Figure 5.

As shown in Figure 12 the sliding structure illustrated in Figures 1 and 4 is shown in connection with the cover plate 54 which may be held in place by friction or other means without departing from the spirit of the invention. This plate preferably fits frictionally against the various clips 1 and is held in place thereby, so that it may be quickly removed whenever desired. When using the sliding structure shown in Figure 12, the cover 54 need not be removed but the parts when folded will slide therein.

In Figure 8 a slightly modified structure is provided wherein the lens 55 is removably mounted, the same being suitably mounted on the plate 56 having notches 57 adapted to interlock with the pins 58. The casing 49 covers the lens 27 similar to that shown in Figure 3, said lens being associated with the identical structure shown in Figure 3, the only difference between this structure and that shown in Figures 3 and 5 being that the lens 55 is exterior of the lens 27 and is also removably mounted.

As shown in Figure 9, the camera 26' is provided with a lens 59 having a position with respect to the remaining part of the camera different from that disclosed in Figures 1 and 4. In view of this fact the tubular bars 60 are rigidly secured to plate 61 which is pivotally mounted on the camera by a suitable screw 62. Arc-shaped slots 63 are provided in the plate 61 through which the pins 64 extend. A swinging movement of the plate is limited to a 90° movement. When swung to the position shown in Figure 9 the links 52 and 53 which are identical to those shown in Figure 4 may be swung outwardly, and also the frame 17' may be swung to functioning position. The parts also include the rods 51 which may be pulled out to their fullest extent which is the focusing position. When it is desired not to use this device, the parts 17', 52 and 53 are folded and swung between the rods 51 and these rods are slid back into the tubular members 60, after which the entire assemblage is swung through 90 degrees until the rods 60 extend the long way of the camera 26'.

In Figure 10 a further form of sliding support for the frame 17' is shown. In this form of the invention the only pivotal mounting is the pivotal mounting of frame 17' on the end members 65 which are carried by the sliding bars 66, which bars slide into tubes 67, and these tubes in turn slide into the tubular members 60'. Tubular members 60' are rigidly secured to plates 68 and 69 which are provided with apertures for the reception of screws whereby the parts may be screwed rigidly into position on the side of the camera.

In Figure 11 a further modified form of holder is shown wherein a guiding structure 70 is secured upon the camera and carries a sliding rectangular shaped bar 71 having an upturned socket 72 which receives the depending flat pin 73 rigidly secured to the frame 17". Bar 71 is pulled outwardly to substantially the position shown in Figure 11, and the frame 17" placed thereon. The title sheet in frame 17" is then in proper focus and may be exposed the desired number of times. This form of holder is particularly well adapted for still cameras, though it might be used in other forms of cameras without departing from the spirit of the invention.

In all forms of the holder the title sheet frame is moved to a position in front of the lens when in functioning position, and when not needed is moved to a position away from in front of the lens. In most forms of the invention the title sheet holding frame is swingably mounted and is moved out of the way to a desired place, usually to the side of the camera.

Heretofore in the use of amateur and professional moving picture cameras difficulty has been experienced in providing the proper number of exposures for each line of the title. In the case of amateur picture taking it has been quite customary to count a certain number of times thus gauging the amount of time the camera is to function for each line. This more or less haphazard method sometimes produces good results and sometimes very poor results. In the present invention a structure has been provided which will quickly move the title sheet in front of the lens and quickly cause a proper focusing thereof. Associated with these devices is a structure which can be readily set to cause the camera to function a sufficient time to secure always an accurate number of exposures for each line to permit ready reading thereof when the pictures are projected at a later date. This structure is shown particularly in Figures 13 to 18, inclusive. Referring to these figures it is desired to be understood that most of the structures shown in these figures are old and well known and that the invention is applied to these old and well known structures.

As illustrated in Figure 13 the spring casing 74 is old and well known and the various gears 75 are old and well known. These trains of gears operate the shutter 76 in the usual way. A cam 77 is connected to shaft 78 which is rotated as the shutter 76 functions. A pivotally mounted stop 79 is secured to shaft 80 and when the camera is not operating the end of stop 79 is resting against the cam 77, thus preventing further movement of the shutter and its driving mechanism.

Stop 79 is provided with a hook 81 which is adapted to interlock with the spring catch 82, as shown in Figure 13. A thumb or finger operated lever 83 which is positioned exterior of the camera is rigidly secured to shaft 80, as shown in Figure 17. When this lever is in its upper position, stop 79 as indicated by the dotted lines in Figure 17, is engaging and stopping the rotation of cam 77. When it is desired to take a string of pictures, or in other words to cause the shutter to function, lever 83 is forced down manually and, consequently, stop 79 is swung away from cam 77 until the hook 81 engages the catch 82, as shown in Figure 13. The camera will then continue to function on the actuation of the spring 84 until lever 83 is moved upwardly again, which will swing stop 79 to its functioning position, as shown in Figure 15. The structure just described is old and well known, and in the present invention certain parts have been added thereto to vary its action. As shown in the drawings, a bracket 85 is rigidly secured to the catch 82 and an arm 86 is swingably mounted thereon and resiliently held in a given position by the spring 87. Associated with the arm 86 is a cam 88 rigidly secured to a shaft 89, which shaft extends through the casing and has a thumb or finger member 90 rigidly secured thereto. Cam 88 is rigidly secured to shaft 89 and is formed with a rounded portion 91 which merges into sleeve 92, which sleeve is formed with grooves 93 and 94, and a spring 94' is adapted to fit into either of these grooves according to the position of sleeve 92 and cam 88. When the different parts are not functioning they are as shown in Fig. 16, and when it is desired to cause the parts to function the thumb member 90 is pulled outwardly, whereupon the gear wheel 95 rigidly secured to shaft 89 is moved into mesh with the gear wheel 75'. If the cam 88 is opposite the arm 86 at this time, said arm will be swung to one side against the action of the spring 87. The arm member 90 is then rotated until the parts are properly set. As shown in Figure 17 there are four positions for setting the cam 88. If there should be three lines in the title, as shown in Figure 1, the pointer 96 is positioned as shown in Figure 17, namely, so that it will point toward the number 3. When the parts have been turned to this position, the cam 88 will be three-fourths turned from contact with arm 86. Gear wheel 95 will then be moved over into mesh with gear wheel 75'. The parts are then ready for operation and by pushing down on lever 83 (Figure 17) the abutment 79 will be moved away from cam 77 and spring 84 will immediately cause the parts to function. As the shutter 76 rotates the gear wheel 75' will also rotate and this will rotate gear wheel 95 three-fourths of a revolution. At the end of the three-fourths revolution the cam 88 will engage arm 86 and move the same until the parts assume the position shown in Figure 15. By swinging the catch 82 downwardly as just described, spring 97 is also allowed to function and said spring will quickly move the abutment 79 up to the position shown in Figure 15, whereupon it will engage the cam 77 and stop the rotation of shutter 76. If four lines are arranged on the title sheet 18, the pointer 96 will be moved around to the number 4 and the same operation takes place except that the parts will operate one quarter of a revolution longer.

As the shutter 76 and other parts are timed to operate at a certain speed where there are four lines in the title, the shutter and associated parts will operate four times as long as where there is only one line, thus giving an accurate timing for the different number of lines in the title. By varying the respective sizes of the gear wheels 75' and 95 the time allowed for each line may be increased or decreased. However, after the desired time is determined they are arranged as shown in the accompanying drawings and never changed thereafter.

After having taken the title, and cam 88 having thrown off the catch 82, the member 90 is forced inwardly so that gear wheel 95 will be moved out of mesh with the gear wheel 75', and the camera is then in condition for operation in the usual manner. If it is desired to immediately take a picture after having photographed the title sheet 18, the lever 83 is forced downwardly until hook 81 engages catch 82 as shown in Figure 13. The camera will then begin to function and will continue to function until lever 83 is moved upwardly manually or spring 84 is run down.

It is to be understood that the construction of the camera is old and well known and therefore forms no part of the present invention except in combination.

We claim:

1. A device of the character described in combination with a camera, comprising a title holding structure, means including a pivotally mounted rod for moving said title holding structure on said camera so that it may be swung against one side of the camera when in one extreme position and swung to a position in front of the camera when in a second extreme position and means for focusing a title sheet in said holder on the film in the camera, said means including a movable lens and a plurality of levers for shifting said lens, one of said levers being positioned in the path of movement of said rod as it is swung from a position against one side of the camera to a position in front of the camera so as to be actuated thereby when the holding structure is moved to a functioning position.

2. In a device of the character described, a frame adapted to be connected to the side of a camera, a rod carried by said frame, a swinging frame swingably mounted on said rod, friction means for preventing free swinging movement of the swinging frame, a pair of arms pivotally mounted at the outer end of the swinging frame, and a title sheet carrying frame pivotally mounted on said arms near the outer ends thereof, said arms having stops, one stop coacting with the swinging frame to limit the outward swinging movement of the arms to a position in alignment with the swinging frame, the other stop limiting the swinging movement of the sheet carrying frame in one direction to a position at right angles to the swinging frame.

3. A device of the character described in combination with a camera provided with a lens comprising an auxiliary lens, a sliding plate carrying the auxiliary lens, means including a lever for causing the sliding plate to move the auxiliary lens in front of the lens of the camera, a spring acting to move the sliding plate and associated parts back to their former position when released, a swinging frame carried by the camera positioned to engage and move said lever when the swinging frame is swung into functioning position, a sheet carrying frame and means for swingably connecting the sheet carrying frame with the swinging frame, said means acting to hold the sheet carrying frame directly in front of said lens when in functioning position.

4. A device of the character described in combination with a camera provided with a lens, comprising an auxiliary lens, a sliding plate carrying the auxiliary lens, means for slidingly mounting said sliding plate, a bell crank lever for moving said sliding plate in a direction to cause the auxiliary lens to be brought in alignment with the lens of the camera, a spring for moving the lever, sliding plate and auxiliary lens back to their former positions, a link connected with said bell crank lever for moving the same against the action of said spring, a swinging member connected with said link for moving the link and a swinging support carried by the camera positioned so that when swung to one extreme position it will engage and move said swinging member in a direction to cause said link to be moved against the action of said spring, and means carried by the swinging support for supporting a title carrying sheet.

5. A device of the character described comprising a camera, a substantially U-shaped structure swingably mounted on said camera, the closed end of the U-shaped structure being positioned adjacent one end of the camera while the remaining part is adapted to be swung to a position to one side of the camera or to a position substantially in front of and parallel to one side of the camera, a pair of links pivotally connected to the outer end of said U-shaped member, and a sheet carrying frame pivotally connected to the outer end of said links, means for limiting the swinging movement of said links, and means on said links for limiting the swinging movement of said frame in one direction so that its final position will be in a plane parallel to the front of the camera, and means for focusing the camera on said frame.

6. The combination with a camera of means for holding a sheet of paper in front of the camera at a comparatively short distance therefrom, said means including a swinging structure carried by the camera, a pair of arms pivotally connected to the outer end of said swinging structure and formed to be swung to a position in alignment with said swinging structure, and a sheet carrying frame pivotally mounted on said arms near the outer ends, each of said arms being provided with a stop for limiting the swinging movement of said frame so that the frame will be positioned directly in front of the lens of the camera, and means for producing a proper focus for taking pictures of anything carried by said frame.

7. A device of the character described in combination with a camera provided with a lens, comprising an auxiliary lens arranged between the first mentioned lens and the film of the camera, means for moving the auxiliary lens into and out of functioning position, said means including a sliding carrier for said auxiliary lens, mechanism for moving said carrier to functioning and non-functioning position, said mechanism including a swingable projection, a swingable structure carried by the camera and positioned to engage and move said projection to cause said mechanism to function when the swinging structure is moved to one of its extreme positions, said swinging structure being formed with means for supporting a sheet of material having a title thereon, said means for supporting the sheet of material being in front of said lens when said swinging structure has been moved to said extreme position.

8. In a device of the character described in combination with a camera having a lens, means for supporting a sheet of paper in front of the lens, said means including a frame, a pair of arms pivotally connected to said frame, a substantially U-shaped structure having the outer ends of the arms thereof pivotally connected with the first mentioned arms whereby the two sets of arms and the frame may be swingably nested, a pair of supporting members carrying the U-shaped structure, and a supporting structure carrying the supporting members, said supporting structure comprising a pair of tubular members, a plate, means for pivotally mounting the plate on the camera so that the supporting structure may be swung to a position for exposing said frame in front of said lens and to a position at right angles thereto.

9. In a device of the character specified, a camera, a lens carried thereby, a frame carrying a subject to be photographed, means for movably connecting said frame to the camera, an auxiliary lens, a movable carrier therefor, mechanism for moving the carrier so that the auxiliary lens will be moved in front of the first mentioned lens, said mechanism including a swinging extension, said means for movably connecting the frame to the camera being positioned to strike and move said extension to cause the same to swing in a direction to cause said mechanism to function when said frame is moved to functioning position in front of said camera, whereby when said frame is moved into and out of position in front of said lens the auxiliary lens will be brought into and out of alinement with the camera lens.

ELWYN E. KEINERT.
JAMES W. KOPKE.
SAMUEL E. FAUCETT.